May 29, 1934. E. J. KINGSBURY Re. 19,185
DRILLING MACHINE
Original Filed Oct. 19, 1927 4 Sheets-Sheet 1
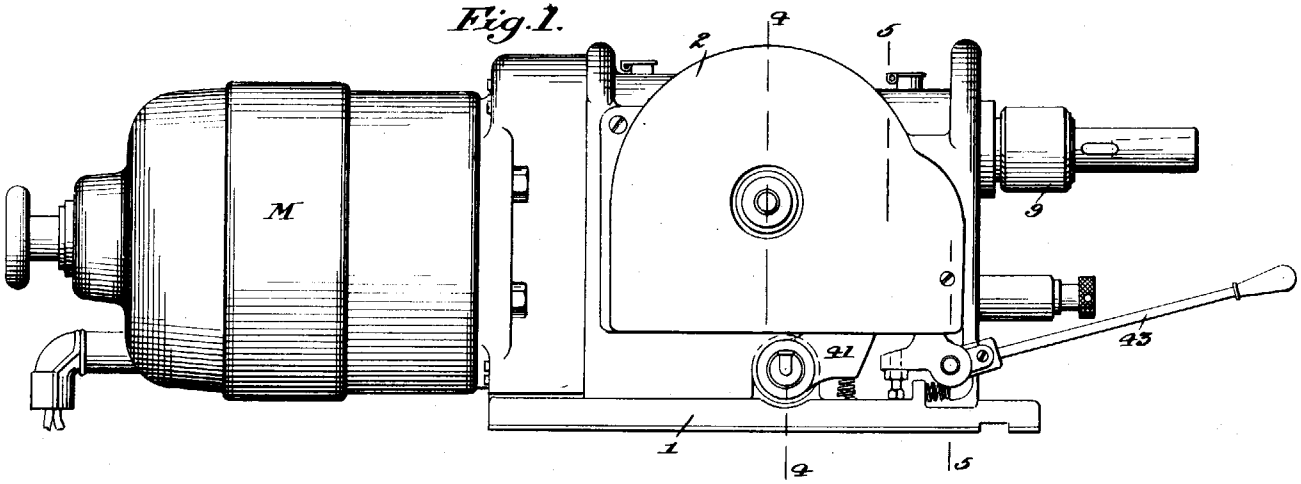
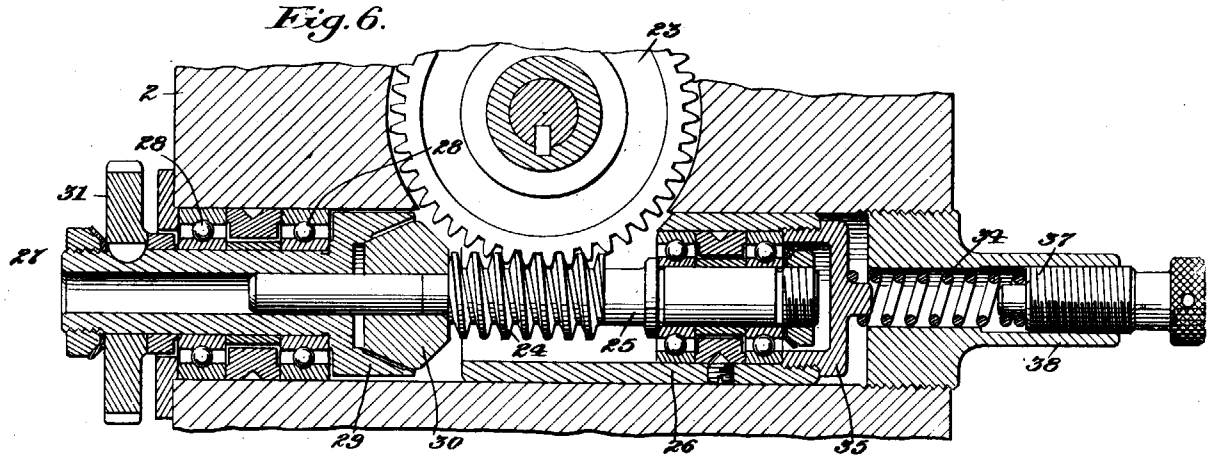
Inventor:
Edward J. Kingsbury,
By Sturtevant & Mason
Att'ys.

May 29, 1934. E. J. KINGSBURY Re. 19,185
DRILLING MACHINE
Original Filed Oct. 19, 1927 4 Sheets-Sheet 2
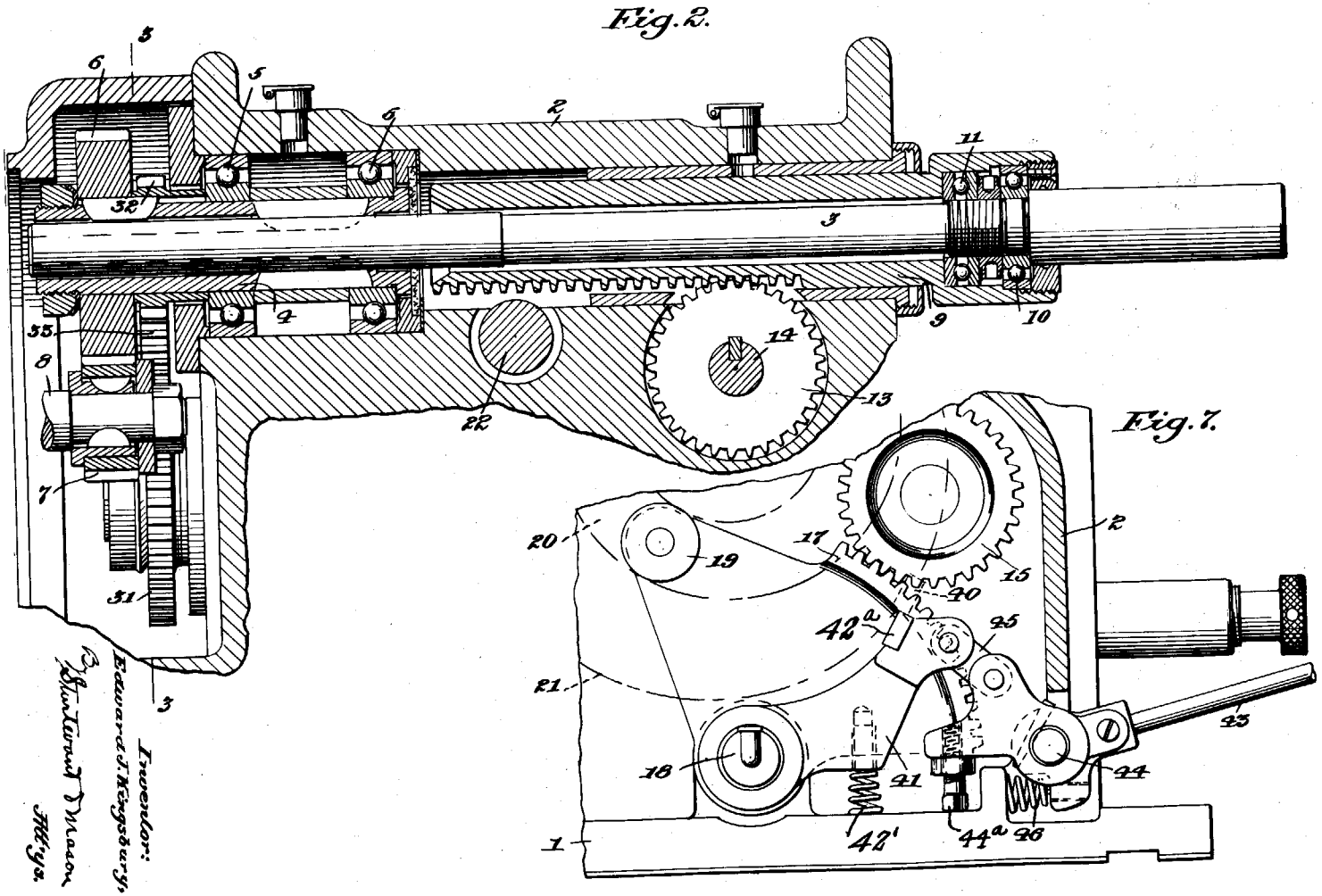

May 29, 1934. E. J. KINGSBURY Re. 19,185
DRILLING MACHINE
Original Filed Oct. 19, 1927 4 Sheets-Sheet 3
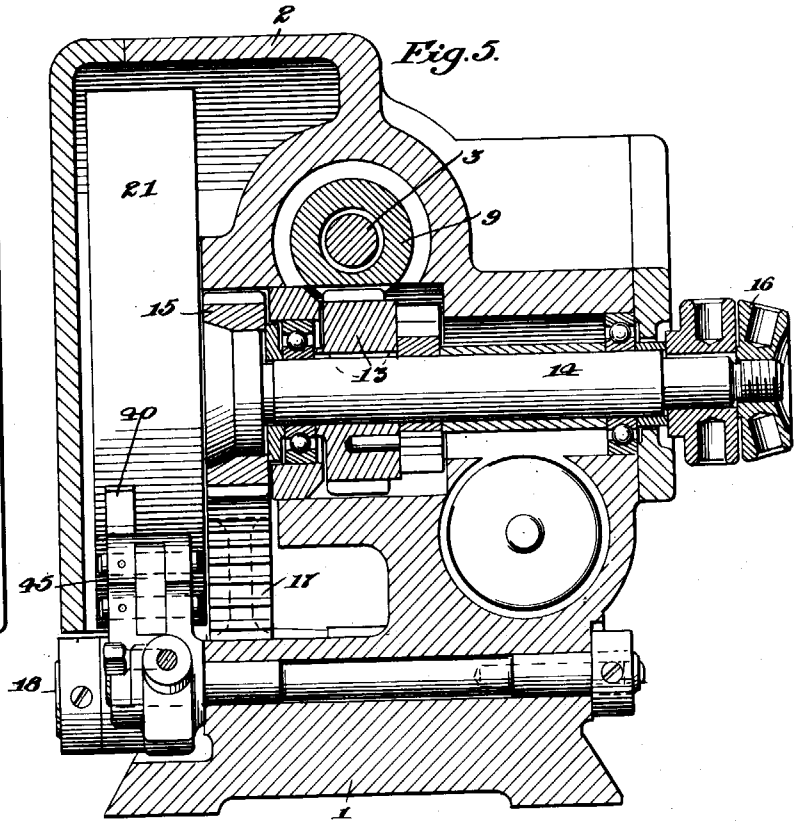
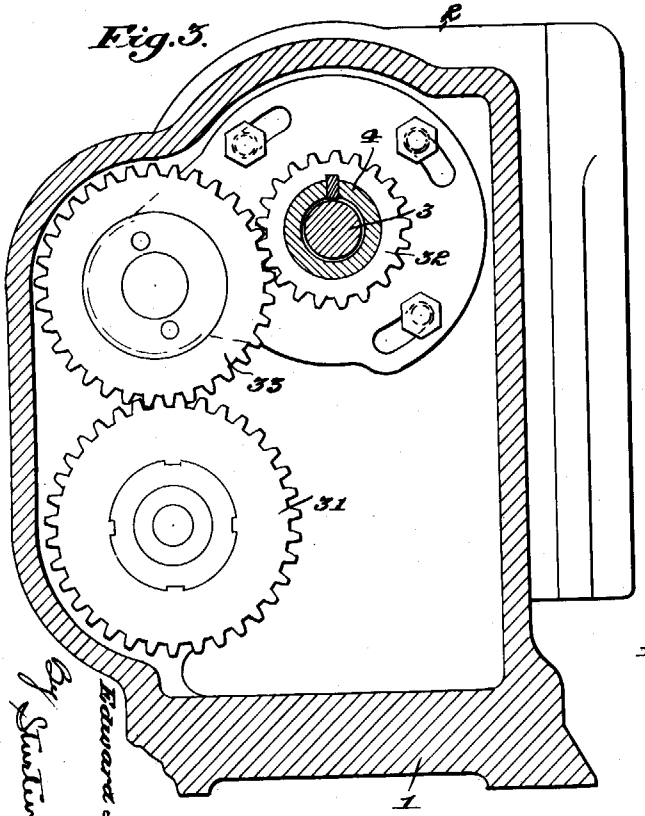
Inventor:
Edward J. Kingsbury,
By Sturtevant Mason
Att'ys.

May 29, 1934. E. J. KINGSBURY Re. 19,185

DRILLING MACHINE

Original Filed Oct. 19, 1927 4 Sheets-Sheet 4

Inventor:
Edward J. Kingsbury,
By Sturtevant & Mason
Att'ys.

Reissued May 29, 1934

Re. 19,185

UNITED STATES PATENT OFFICE 19,185

DRILLING MACHINE

Edward J. Kingsbury, Keene, N. H.

Original No. 1,780,083, dated October 28, 1930, Serial No. 227,227, October 19, 1927. Application for reissue October 27, 1932, Serial No. 639,926

15 Claims. (Cl. 77—32)

The invention relates to new and useful improvements in automatic drilling machines, and more particularly to the means for imparting a reciprocating feed movement to the drill spindle.

An object of the invention is to provide a drilling machine with automatic means for imparting a reciprocating feed movement to the drill spindle, which automatic means, while it includes a rotating means for imparting feed movement to said spindle, also includes devices whereby the extent of forward movement of the spindle for each rotation of the drill spindle is diminished when the drill engages the material, to conform to the cutting capacity of the drill.

A further object of the invention is to provide an automatic drill feeding means whereby a rotating member is utilized for imparting forward movement to the spindle, and said rotating member is actuated by devices which include a clutch having friction members which are caused to slip or be disengaged when the forward movement of the drill is resisted to a predetermined degree, so that the extent of forward movement given the spindle for each rotation of the drill may be diminished to conform to the cutting capacity of the drill.

A still further object of the invention is to provide an automatic means for imparting a reciprocating feed movement to the spindle of the above type, wherein the means for controlling the separation of the friction clutch members may be adjusted so as to vary the degree of resisting pressure, which will bring about a slipping of the clutch members or a separation of the same.

These and other objects will in part be obvious and will in part be hereinafter more fully disclosed.

In the drawings which show by way of illustration one embodiment of the invention:

Figure 1 is a side view of a drilling machine embodying the improvements.

Figure 2 is a longitudinal sectional view through the housing and the supporting and operating parts for the spindle.

Figure 3 is an end view of the housing as viewed from the left in Figure 2.

Figure 5 is a transverse sectional view through the housing on the line 5—5 of Figure 1.

Figure 6 is a longitudinal sectional view on the line of the actuating cross shaft.

Figure 7 is a detail partly in section showing the manual controlling means for the machine.

Figure 4:
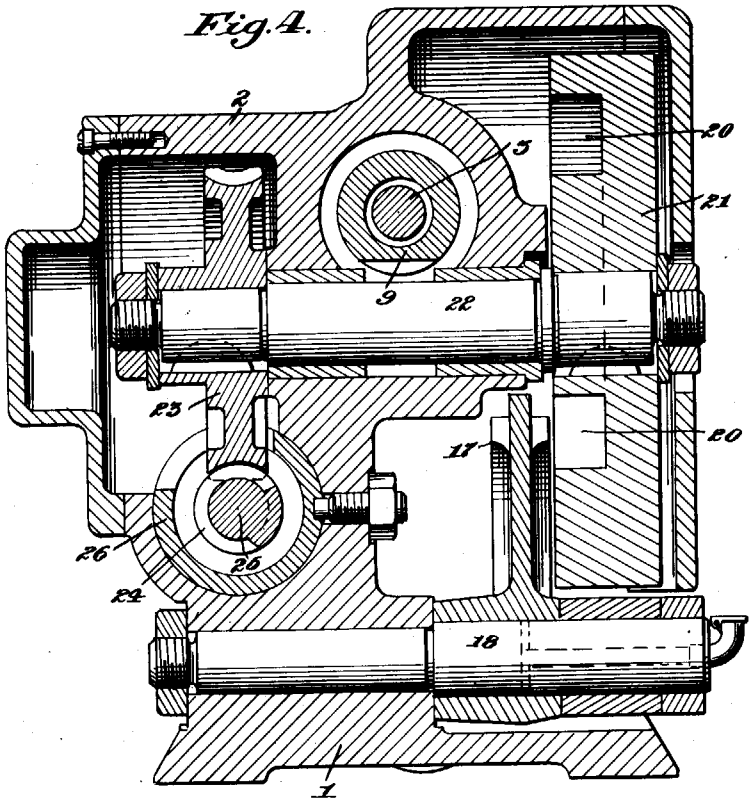
Figure 4 is a transverse sectional view through the housing on the line 4—4 of Fig. 1.

The invention is directed broadly to an automatic drilling machine which includes a spindle which is driven by a motor. The spindle is mounted in the housing so that it may be rotated and may also be moved endwise for imparting a feed movement to the drill. The invention is directed more particularly to the means which imparts a feed movement to the drill spindle.

The drill spindle is mounted in a sleeve which is capable of endwise movement in the housing therefor, and when this sleeve is moved endwise it will impart an endwise movement to the drill spindle and thus a feeding movement to the drill. The sleeve is provided with a rack which engages a pinion, which pinion is rotated first in one direction and then the other for reciprocating the sleeve, and thus moving the drill forward into the material and retracting the same from the material. This pinion is mounted on a shaft which is rotated first in one direction and then the other by an oscillating segment gear. The oscillating segment gear is in turn oscillated by a rotating cam mounted on a shaft which supports a worm gear, and the worm gear meshes with a worm mounted on a shaft which carries one member of a friction clutch fixed thereto. The cooperating member of the friction clutch is mounted on a shaft journaled in suitable bearings in the housing and held from endwise movement. This last named member of the clutch is continuously driven. A spring moves the shaft carrying the worms so as to bring the clutch member into engagement. When the clutch members are in engagement then the worm gear will be rotated. This will rotate the cam which oscillates the segment gear and thus it is that the spindle is moved for its feeding movement.

When the drill engages the material and its forward movement is arrested or restrained, this will stop or restrain the movement of the rotating worm wheel, and the worm wheel will then operate to move the worm and the shaft carried thereby endwise. The worm wheel in the sense becomes a nut and as the worm creeps along the nut it will move the friction clutch member carried thereby out of engagement with the other member of the clutch, and this will either cause the clutch members to slip or be entirely separated. As soon as the restricting pressure against the spindle is relieved, then the spring will move the shaft and thus feed the drill forward.

Referring more in detail to the drawings, the invention is embodied in a machine which includes a base portion 1 carrying a housing 2. Mounted in this housing is a drill spindle 3 to which drills of the desired type may be attached in the usual way. The drill spindle 3 is mounted in a sleeve 4 which in turn is carried by bearings 5—5 mounted in the housing. The spindle is connected to the sleeve so that it rotates with the sleeve, but it also has an endwise movement in the sleeve. The sleeve has no endwise movement in the housing, but is rotated by a pinion 6 meshing with a pinion 7 on the end of the motor shaft 8 of the motor M, which is secured by suitable supporting devices to the housing of the drilling machine.

The drill spindle is mounted at its right hand end, as viewed in Fig. 2, in a sleeve 9. There is a bearing 10 for supporting the spindle at the outer end of the sleeve, so that the spindle rotates freely in the sleeve. There is also a thrust bearing 11 at the outer end of the sleeve, which engages a collar on the spindle so that the endwise movements of the sleeve 9 shall shift the rotating position of the spindle in the sleeve 4.

The sleeve 9 is provided with a rack on its lower face, which rack meshes with a pinion 13. The pinion 13 is carried by a cross-shaft 14 mounted in bearings in the housing 2.

The cross-shaft 14 carries a pinion 15 on its inner end. The pinion has a tapered opening therein and the shaft 14 has a tapered portion which is drawn into engagement with the tapered portion of the pinion 15 by the aid of a nut 16 at the other end of the shaft. By loosening the nut 16 the pinion 15 may be shifted on its shaft. This is for the purpose of adjustment.

It will be noted that as the shaft 14 is rotated in one direction, the sleeve 9 will be moved so as to feed the drill forward, and when the shaft 14 is rotating in the other direction, then the sleeve 9 will be moved so as to retract the drill. This shaft 14 is rotated first in one direction and then in the other by a segment gear 17. This segment gear meshes with the pinion 15. The segment gear is pivoted at 18 and is provided with a roller 19 which runs in a cam groove 20 formed in a cam disk 21 (see Figs. 1 and 4). This cam disk 21 is mounted on a cross-shaft 22 mounted in suitable bearings in the housing. The cross-shaft 22 carries a worm gear 23 which meshes with a worm 24 (see Fig. 6). The worm 24 is formed in a shaft 25. This shaft 25 is mounted at its right hand end in a sleeve 26, and the sleeve 26 is in turn mounted in the housing of the machine so that said sleeve can freely move endwise in the housing. The shaft 25 at its other end extends into a sleeve shaft 27, and is supported therein for rotation, but is free to move endwise of this sleeve shaft 27. The sleeve shaft 27 is mounted in ball-bearings 28, 28 carried by the housing.

This sleeve shaft 27 carries a member 29 of a friction clutch. The other member 30 of the friction clutch is mounted on the shaft 25. When the parts are in the position in Fig. 6, then the clutch members 29 and 30 are in engagement and any rotations imparted to the shaft 27 will be transmitted to the shaft 25. The shaft 27 is rotated by a pinion 31.

The pinion 31 is driven from a pinion 32 on the sleeve 4 through an intermediate pinion 33. From the above it will be apparent that the motor rotates the spindle, and through the pinions 32, 33 and 31 imparts a continuous rotation to the sleeve shaft 27. When the clutch members are in engagement, the shaft 25 will be rotated, and this will rotate the worm gear 23, which in turn rotates the cam 21 and the cam 21 will oscillate the segment gear, which, through its train of connection, will cause the sleeve 9 to move endwise.

The sleeve 9 will thus be moved in one direction, so long as the segment gear is moved in one direction, and when it reverses its direction of movement by the action of the cam groove thereon, then the spindle will be retracted. Thus it is that reciprocating movements will automatically be imparted to the drill spindle through the same driving means for rotating the spindle. The machine is therefore automatic in its operation.

When the drill engages the material the forward movement of the drill will be restrained, and this restraining movement will stop the forward movement of the sleeve 9, which will stop the oscillations of the segment gear, and this will stop or retard the action of the worm gear 23, and when worm gear 23 is stopped or retarded, then it will act as a nut so that the rotations imparted to the worm on the shaft 25 will cause the worm to creep or move to the right, as viewed in Fig. 6. This movement of the worm to the right will cause, in turn, the members of the friction clutch to be partly disengaged so that one will slip on the other or be completely disengaged, which of course would cause shaft 25 to stop rotation. The shaft 25 is moved endwise by a spring 34 which bears against a member 35 threaded into the end of the sleeve 26.

The spring 34 at its right hand end bears against an abutment 37 threaded into a sleeve 38, which in turn has a threaded engagement with the housing. By adjusting the abutment 37 through the turning of the same, the tension of the spring may be varied. By varying the tension of the spring, the degree of restraining pressure which will cause the members of the clutch to separate will also be varied.

In the operation of the machine, let us assume that a drill comes in contact with the material, then it is desired to regulate the forward movement of the drill spindle to conform to the amount of material cut away. The rapidity with which the material is cut away will always depend upon the efficiency of the drill and the character of the material being cut. Whatever that may be, it is desired that the forward feed of the drill shall conform to the cutting away of the material by the drill. It will readily be seen that when the drill engages the material, that its forward movement will be restrained, and this, through the restraining of the movement of the worm gear, will cause the clutch members to be separated to a slight extent, causing slipping in the clutch, and thus a slower forward feed of the drill spindle. If a very hard spot is engaged by the drill so that for an instant there is no possible forward feed of the drill, then the clutch members will be entirely separated and the feed in the forward direction will cease. Just as soon, however, as the drill can move forward, then the spring 34 will move the shaft 25 endwise, and through the worm turn the worm wheel, causing the drill to move forward, and as soon as the drill has moved a sufficient distance, then the action of the spring will bring the clutch members into engagement, and the worm wheel will be turned by the clutch and the forward feed of the drill continued.

From the above it will be apparent that I have provided a rotating means for imparting a forward movement to the drill spindle, so that the drill spindle is in a sense positively moved forward, and the forward movement of the drill is regulated by a positive feed. Nevertheless, when conditions of drilling are reached, then the feed movement imparted to the spindle is regulated to conform to the cutting away of the material by the drill. This may be a very much diminished forward feed movement of the drill, or the drill may actually stop in its forward movement, until it has cut through an extremely hard part and is ready to proceed. At no time is the means for feeding the spindle forward out of control, and if a soft spot is reached in the material, there will be no jumping forward of the drill, as the clutch will close immediately and take up the control of the forward feed of the drill spindle.

The feeding movement imparted to the drill spindle may be stopped at a predetermined point by devices shown in Figs. 1 and 7 of the drawings. These devices include a stop or dog 40 mounted on the cam 21. The position of this stop on the cam will determine, of course, the position of the drill spindle when the feed is stopped.

Adjacent the cam 21 is a lever 41 which is pivoted so as to swing about the axis of the gear segment 17. A spring 42 operates to swing the lever in a counter-clockwise direction on its pivotal support. A block 42[a] is carried by this lever 41. When the parts have moved to the position shown in Fig. 7, then the block 42[a] is in the path of rotation of the stop 40 on the cam as the cam rotates in a clockwise direction. When the stop engages the block this will prevent further rotation of the cam, and when the cam stops then the worm gear stops and automatically the worm is moved endwise so that the clutch members are disengaged from each other. This is a complete stopping of the worm gear, and therefore the clutch members will be completely separated and no further movement imparted to the worm gear while said cam is held from rotation. The other member of the clutch, however, and the drill spindle will continue their rotation.

The lever 41 is manually controlled by a hand lever 43 which is pivoted at 44 to the housing, and is connected by a link 45 with the lever 41. A spring 46 tends to raise the hand lever 43 so that when the hand lever is released, the lever 41 will be raised and the stop moved into position to stop the feed of the drill. In order to limit and to properly position the block when the hand lever is released, there has been provided a stop 44[a] which engages the base of the machine and limits the upward movement of the hand lever. The stop is preferably set on the cam so that the spindle is at the rear or inner end of its stroke when the feed stops. To start the cycle of operation, the trip lever is depressed, which draws the block from the path of movement of the stop and the cam is then free to move and the spring 34 will move the worm and the shaft on which it is mounted endwise, bringing the clutch members into engagement, and the feed of the drill spindle is automatically and immediately resumed.

It is obvious that minor changes in the construction and arrangement of the parts may be made without departing from the spirit of the invention as set forth in the appended claims.

Having thus described the invention, what I claim as new and desire to secure by Letters Patent, is—

1. The combination of a drill spindle adapted to carry a drill, means for supporting said spindle whereby it may be rotated and reciprocated, means for rotating the spindle, means for imparting a feeding movement to the spindle including an oscillating segment, a shaft, a cam carried by the shaft, an arm connected to the segment and oscillated by said cam, a sleeve, means for continuously rotating said sleeve, a clutch member carried by said sleeve, a shaft mounted for endwise movement in alignment with said sleeve and having a bearing in said sleeve, a clutch member carried by said shaft and adapted to engage the clutch member carried by the sleeve, a spiral gear carried by said shaft and meshing with said worm gear, a spring bearing on the end of said shaft and normally moving said shaft endwise for engaging said clutch members, said drill spindle when restrained in the feeding movement of the drill operating to restrain the movement of the worm gear and to cause the shaft carrying the clutch member to move endwise against the action of the spring for releasing the driving connection between the clutch members.

2. The combination of a drill spindle adapted to carry a drill, means for supporting said spindle whereby it may be rotated and reciprocated, means for rotating the spindle, means for imparting a feeding movement to the spindle including an oscillating segment, a shaft, a cam carried by the shaft, an arm connected to the segment and oscillated by said cam, a sleeve, means for continuously rotating said sleeve, a clutch member carried by said sleeve, a shaft mounted for endwise movement in alignment with said sleeve and having a bearing in said sleeve, a clutch member carried by said shaft and adapted to engage the clutch member carried by the sleeve, a spiral gear carried by said shaft and meshing with said worm gear, a movable bearing attached to the end of said shaft, a spring engaging the bearing for normally moving said shaft endwise for engaging said clutch members, said drill spindle when restrained in the feeding movement of the drill operating to restrain the movement of the work gear and to cause the shaft carrying the clutch member to move endwise against the action of the spring for releasing the driving connection between the clutch members.

3. A self-contained drilling unit including a supporting frame, a drill spindle adapted to carry a drill, means mounted in said frame for supporting said spindle whereby it may be rotated and reciprocated, a motor mounted on said frame and having a driving connection with said spindle for continuously rotating the same feeding means operated by said motor including a control cam, devices operated thereby for imparting a feeding movement of the spindle toward the work, a driving shaft connected to said motor and held against axial movement, a driven shaft in axial alignment therewith, friction clutch members carried by the adjacent ends of said shafts, yielding means for moving the driven shaft axially for causing engagement of the clutch members, a driving connection between the driven shaft and the control cam constructed and disposed so that the driving torque tends to move the driven shaft axially for releasing the clutch members, means for stopping the control cam upon completion of a feed cycle whereupon the driving torque releases the driving connection between the clutch members, said yielding means operating upon the release of the control cam to establish the driving connection of said clutch members.

4. A self-contained drilling unit including a supporting frame, a drill spindle adapted to carry a drill, means mounted in said frame for supporting said spindle whereby it may be rotated and reciprocated, a motor mounted on said frame and having a driving connection with said spindle for continuously rotating the same feeding means operated by said motor including a control cam, devices operated thereby for imparting a feeding movement of the spindle toward the work, a driving shaft connected to said motor and held against axial movement, a driven shaft in axial alignment therewith, friction clutch members carried by the adjacent ends of said shafts, yielding means for moving the driven shaft axially for causing engagement of the clutch members, a worm mounted on said driven shaft, a worm gear meshing therewith and connected to said control cam, said worm and worm gear being constructed and arranged so that the driving torque tends to move the driven shaft axially for releasing the clutch members, means for stopping the control cam upon completion of a feed cycle whereupon the driving torque releases the driving connection between the clutch members, said yielding means operating upon the release of the control cam to establish the driving connection of the clutch members.

5. A self-contained drilling unit including a supporting frame, a drill spindle adapted to carry a drill, means mounted in said frame for supporting said spindle whereby it may be rotated and reciprocated, a motor mounted on said frame and having a driving connection with said spindle for continuously rotating the same feeding means operated by said motor including a control cam, devices operated thereby for imparting a feeding movement of the spindle toward the work, a driving shaft connected to said motor and held against axial movement, a driven shaft in axial alignment therewith, friction clutch members carried by the adjacent ends of said shafts, yielding means for moving the driven shaft axially for causing engagement of the clutch members, a driving connection between the driven shaft and the control cam constructed and disposed so that the driving torque tends to move the driven shaft axially for releasing the clutch members, means for stopping the control cam after a predetermined angular movement, and manually controlled means for releasing the stopping means to initiate a new cycle and movement of said cam.

6. A self-contained drilling unit including a supporting frame, a drill spindle adapted to carry a drill, means mounted in said frame for supporting said spindle whereby it may be rotated and reciprocated, a motor mounted on said frame and having a driving connection with said spindle for continuously rotating the same feeding means operated by said motor including a control cam, devices operated thereby for imparting a feeding movement of the spindle toward the work, a driving shaft connected to said motor and held against axial movement, a driven shaft in axial alignment therewith, friction clutch members carried by the adjacent ends of said shafts, yielding means for moving the driven shaft axially for causing engagement of the clutch members, a driving connection between the driven shaft and the control cam constructed and disposed so that the driving torque tends to move the driven shaft axially for releasing the clutch members, a stop moving in timing with the control cam, a lever, a member carried thereby, a spring for moving said lever to place said member in the path of movement of the stop whereby said control cam may be stopped after a predetermined angular movement thereof, and manual means for shifting said lever to release the member from the path of travel of the stop for initiating a new cycle of movement of the cam.

7. A self-contained drilling unit including a supporting frame, a drill spindle adapted to carry a drill, means mounted in said frame for supporting said spindle whereby it may be rotated and reciprocated, a motor mounted on said frame and having a driving connection with said spindle for continuously rotating the same, feeding means operated by said motor including a control cam, devices operated thereby for imparting a feeding movement of the spindle toward the work, a driving shaft connected to said motor and held against axial movement, a driven shaft in axial alignment therewith, friction clutch members carried by the adjacent ends of said shafts, yielding means for moving the driven shaft axially for causing engagement of the clutch members, a worm carried by said driven shaft, a worm wheel meshing therewith connected to said cam for rotating the same, said worm and worm wheel being disposed so that the driving torque tends to move the driven shaft axially for releasing the clutch members, a stop moving in timing with said control cam, a lever, a member carried thereby, a spring for moving said lever for placing said member in the path of travel of said stop, and manual means for shifting the lever to retract the member from the path of travel of said stop to initiate a new cycle of movement of said cam.

8. The combination of a supporting frame, a tool holder, means mounted in the frame for supporting the tool holder, means for imparting a feeding movement to the tool holder toward the work including a control cam, a shaft on which said control cam is mounted, a spiral gear carried by said shaft, a worm gear meshing with said spiral gear, a shaft section carrying said spiral gear, a clutch member mounted on said shaft section, said shaft section being supported for endwise movement, a shaft section mounted in the frame in axial alinement with the shaft section carrying the spiral gear, a clutch member carried by said shaft section mounted in the frame and cooperating with the clutch member on the shaft carrying the spiral gear, an adjustable abutment fixed to said frame, and a spring interposed between said abutment and the shaft carrying the spiral gear and normally forcing said clutch members into engagement, said abutment having a projecting portion extending beyond the frame whereby the same is readily accessible for adjusting the abutment.

9. The combination of a supporting frame, a tool holder, means mounted in the frame for supporting the tool holder, means for imparting a feeding movement to the tool holder toward the work including a control cam, a shaft on which said control cam is mounted, a spiral gear carried by said shaft, a worm gear meshing with said spiral gear, a shaft section carrying said spiral gear, a clutch member mounted on said shaft section, said shaft section being supported for endwise movement, a shaft section mounted in the frame in axial alinement with the shaft section carrying the spiral gear, a clutch member carried by said shaft section mounted in the frame and cooperating with the clutch member on the shaft carrying the spiral gear, an adjustable abutment fixed to said frame, a spring interposed between said abutment and the shaft carrying the spiral gear and normally forcing said clutch members into engagement, said abutment having a projecting portion extending beyond the frame whereby the same is readily accessible for adjusting the abutment, and manually controlled means whereby said cam may be stopped with the tool holder in retracted position, so that the turning of the shaft section carrying the spiral gear will cause an endwise movement of the shaft section carrying said gear and the driving connection between the clutch members to be released.

10. The combination of a supporting frame, a drill spindle adapted to carry a drill, means mounted in the frame for supporting the spindle whereby it may be rotated and reciprocated, means for continuously rotating the spindle, means for imparting a feeding movement to the spindle toward the work including a control cam, devices operated by the control cam and connected to the spindle supporting means, a worm gear connected to the cam, a shaft having a spiral gear thereon meshing with the worm gear, said shaft being capable of endwise movement, a driving shaft in alinement with said shaft carrying the spiral gear, clutch members interposed between said shafts, a spring normally forcing said shaft carrying the spiral gear for closing the clutch members, a stop member moving with said control cam, a lever carrying a cooperating stop member pivotally supported adjacent said cam and movable into engagement with the stop member carried by said cam for stopping the rotation thereof, a manually operable trip lever pivotally supported adjacent said lever carrying the stop member, a spring for turning said trip lever in one direction, a stop for limiting the movement of said trip lever, and a link connecting the trip lever to the lever carrying the stop member, said trip lever and link being so disposed so that when said trip lever is released, the lever carrying the stop member will be moved into position for stopping the control cam and will be restrained against movement from said position.

11. The combination of a supporting casing, a rotatable member, means for rotating said member disposed in said casing including an operating shaft, a worm gear for imparting rotations to said shaft, a shaft section mounted for endwise movement and carrying a spiral gear meshing with said worm gear, a driving shaft section in alinement with the section carrying the spiral gear, a motor connected to and rotating said driving shaft, clutch members interposed between said driving shaft and the shaft section carrying the spiral gear, a spring for moving said shaft carrying the spiral gear endwise for closing said clutch members, an abutment carried by the casing against which said spring bears and extending outside of said casing whereby said abutment may be rotated for shifting the same in the casing and varying the tension of the spring closing the clutch members.

12. The combination of a supporting casing, a rotatable member, means for rotating said member disposed in said casing, including an operating shaft, a worm gear for imparting rotations to said shaft, a shaft section mounted for endwise movement and carrying a spiral gear meshing with said worm gear, a driving shaft section in alinement with the section carrying the spiral gear, a motor connected to and rotating said driving shaft, clutch members interposed between said driving shaft and the shaft section carrying the spiral gear, a spring for moving said shaft carrying the spiral gear endwise for closing said clutch members, an abutment carried by the casing against which said spring bears and extending outside of said casing whereby said abutment may be rotated for shifting the same in the casing and varying the tension of the spring closing the clutch members, a stop member movable in timing with said rotatable member, a manually controlled lever adapted to be shifted into the path of movement of said stop member for stopping the rotation of said rotatable member and the worm gear driving the same, whereby the spiral gear causes the shaft on which it is mounted to move endwise for releasing the driving connections between the clutch members.

13. A self-contained portable drilling unit including in combination, a frame, a drill spindle, means mounted in said frame for supporting said spindle whereby it may be rotated and reciprocated, an actuating shaft carried by said frame, a train of gears connecting said actuating shaft to said spindle rotating means whereby said spindle may be continuously rotated, feeding means operated by said actuating shaft for imparting a forward and backward movement to said spindle including a control cam, a driving shaft connected to said actuating shaft, a driven shaft in axial alinement therewith, clutch members carried by the adjacent ends of said driving and driven shafts, yielding means for moving said driving and driven shafts relative to each other axially for causing engagement of the clutch members, a driving connection between the driven shaft and the control cam constructed and disposed so that the driving torque tends to move said shafts relative to each other for releasing the clutch members, means for stopping the control cam upon the completion of the feed cycle whereupon the driving torque releases the driving connection between the clutch members, said yielding means operating upon release of the control cam to establish a driving connection of the clutch members.

14. A self-contained portable drilling unit including in combination, a frame, a drill spindle, means mounted in said frame for supporting said spindle whereby it may be rotated and reciprocated, an actuating shaft mounted in said frame, a train of gears connecting said actuating shaft to said spindle rotating means whereby said spindle may be continuously rotated, feeding means operated by said actuating shaft for imparting a forward and backward movement to said spindle including a control cam, a driving shaft connected to said actuating shaft and held against axial movement, a driven shaft in axial alinement therewith, clutch members carried by the adjacent ends of said shafts, yielding means for moving the driven shaft axially for causing engagement of the clutch members, a driving connection between the driven shaft and the control cam constructed and disposed so that the driving torque tends to move the drive shaft axially for releasing the clutch members, means for stopping the control cam upon the completion of a feed cycle whereupon the driving torque releases the driving connection between the clutch members, said yielding means operating upon the release of the control cam to establish a driving connection of said clutch members.

15. A self-contained portable drilling unit including in combination, a housing having a flat supporting base with parallel sides, a driving sleeve mounted in said housing with the axis thereof parallel with said base, a spindle mounted in said driving sleeve and extending from one end thereof, a motor mounted in said housing with the driving shaft thereof substantially parallel with the axis of the driving sleeve and extending from the driving sleeve in a direction opposite to the end from which the spindle extends, a train of gears connecting the driving sleeve and the motor shaft for transmitting rotary movement to the driving sleeve, a slidable support for the spindle, a mechanism connecting the slidable support and the driving sleeve for imparting the reciprocating motion to the slidable support for feeding the spindle forward and back in a line parallel with the plane and sides of the base, said mechanism including a control cam, a train of gears, a slip connection within said train of gears, means for releasing the slip connection to stop the rotation of the cam upon overload and automatically operating to re-engage said connection upon removal of the overload, means for stopping the cam after predetermined angular movement, and manually controlled means for moving the said stopping means to initiate a new cycle of movement of the cam.

EDWARD J. KINGSBURY.